United States Patent
Robinault et al.

(10) Patent No.: US 11,015,741 B2
(45) Date of Patent: May 25, 2021

(54) ADJUSTABLE FASTENING SUPPORT FOR MOUNTING A TUBULAR ITEM ON AN OUTER MEMBER

(71) Applicant: AVON POLYMERES FRANCE SAS, Vannes (FR)

(72) Inventors: Michel Robinault, Sene (FR); David Gateau, Locmaria Grand Champ (FR); Dane Lesage, Le Bono (FR)

(73) Assignee: AKWEL VANNES FRANCE, Vannes (FR)

( * ) Notice: Subject to any disclaimer, the term of this patent is extended or adjusted under 35 U.S.C. 154(b) by 0 days.

(21) Appl. No.: 16/507,518

(22) Filed: Jul. 10, 2019

(65) Prior Publication Data
US 2020/0032929 A1    Jan. 30, 2020

(30) Foreign Application Priority Data

Jul. 25, 2018 (FR) ...................... 18/70865

(51) Int. Cl.
*F16L 3/137* (2006.01)

(52) U.S. Cl.
CPC .................... *F16L 3/137* (2013.01)

(58) Field of Classification Search
CPC ..... F16L 3/137; F16L 3/24; F16L 3/12; F16L 3/14; F16L 3/123; F16L 3/233; F16L 3/243; F16L 3/2431; F16L 3/245; F16L 3/10; F16L 3/1008; F16L 3/1025; F16L 3/1058; F16L 3/1033; F16L 3/1041; F02M 35/10
USPC .... 248/74.3, 74.4, 74.2, 74.1, 65, 58, 62, 72
See application file for complete search history.

(56) References Cited

U.S. PATENT DOCUMENTS

| | | | | |
|---|---|---|---|---|
| 2,504,291 A | * | 4/1950 | Alderfer ............... | E04G 25/061 254/98 |
| 3,222,030 A | * | 12/1965 | Thorpe ............. | E04F 15/02452 254/100 |
| 3,355,136 A | * | 11/1967 | Staples ................ | F16M 11/046 248/352 |
| 3,471,968 A | * | 10/1969 | Letz ........................ | A01G 29/00 47/47 |
| 3,713,259 A | * | 1/1973 | Tkach ................. | E04B 1/34342 52/111 |
| 3,809,348 A | * | 5/1974 | Di Laura .................. | F16L 3/00 248/49 |
| 4,575,985 A | * | 3/1986 | Eckenrodt ................. | E04C 5/20 52/677 |

(Continued)

FOREIGN PATENT DOCUMENTS

| | | |
|---|---|---|
| EP | 3029364 A1 | 6/2016 |
| JP | S56-3374 A | 1/1981 |

*Primary Examiner* — Nkeisha Smith
(74) *Attorney, Agent, or Firm* — Oliff PLC (57) ABSTRACT

A fastening support includes a generally «C»-shaped annular body having two free ends which can be spaced apart to position the annular body around the item and a tab for fastening to the mounting point of an outer member. Furthermore, in accordance with the invention, the annular body includes, on an inner face, a plurality of retaining notches capable of cooperating with the tubular item such that the annular body is adapted to perform an incremental rotation from one notch to the other under the effect of a mechanical bias in rotation, between first and second angular positions for temporary immobilization in rotation by the retaining notches.

14 Claims, 10 Drawing Sheets

(56) References Cited

U.S. PATENT DOCUMENTS

| | | | | |
|---|---|---|---|---|
| 5,064,971 A * | 11/1991 | Bogdanow | ............ | H01B 17/16 174/169 |
| 5,595,039 A * | 1/1997 | Lowery | ............ | E04C 5/206 52/677 |
| 5,937,488 A | 8/1999 | Geiger | | |
| 6,178,716 B1 * | 1/2001 | Chen | ............ | E04C 5/168 404/135 |
| 6,206,613 B1 * | 3/2001 | Elkins | ............ | F16L 3/26 405/157 |
| 6,332,292 B1 * | 12/2001 | Buzon | ............ | E04D 11/007 248/351 |
| 6,536,717 B2 * | 3/2003 | Parker | ............ | F16L 3/1016 248/346.01 |
| 6,866,445 B2 * | 3/2005 | Semler | ............ | E01C 23/01 404/119 |
| 7,043,869 B1 * | 5/2006 | Hubbard | ............ | A01K 97/10 43/21.2 |
| 7,086,203 B2 * | 8/2006 | Owen | ............ | E01C 23/01 248/354.3 |
| 7,610,728 B1 * | 11/2009 | Manocchia | ............ | E02D 27/01 248/357 |
| 8,829,353 B2 * | 9/2014 | Homner | ............ | H01B 17/14 174/161 R |
| 8,882,057 B2 * | 11/2014 | Dworak, Jr. | ............ | F16L 3/123 248/74.1 |
| 9,464,421 B2 * | 10/2016 | Muderlak | ............ | E03D 5/026 |
| 9,508,472 B2 * | 11/2016 | Deshaies | ............ | H01B 17/16 |
| 9,523,380 B2 * | 12/2016 | Brown | ............ | E04D 13/00 |
| 9,677,276 B2 * | 6/2017 | Gilman | ............ | E04C 5/168 |
| 2004/0163334 A1 * | 8/2004 | Carlson | ............ | E04F 15/02458 52/126.6 |
| 2008/0302435 A1 | 12/2008 | Picton | | |
| 2012/0073237 A1 * | 3/2012 | Brown | ............ | F24F 13/32 52/705 |
| 2012/0174282 A1 | 7/2012 | Newton et al. | | |
| 2013/0117971 A1 * | 5/2013 | Sampson | ............ | F16B 2/10 24/459 |
| 2013/0152849 A1 * | 6/2013 | Yang | ............ | A63B 71/0672 116/223 |
| 2018/0100605 A1 | 4/2018 | Robinault et al. | | |
| 2019/0145547 A1 * | 5/2019 | Ball | ............ | F16L 3/1058 248/558 |

* cited by examiner

ADJUSTABLE FASTENING SUPPORT FOR MOUNTING A TUBULAR ITEM ON AN OUTER MEMBER

TECHNICAL FIELD

The present invention concerns an adjustable fastening support for mounting a tubular item on an outer member. The invention applies more particularly but not exclusively to the fastening of a tubular item such as for example a fluid transfer conduit on an outer member, for example an engine block, a chassis of a motor vehicle or any other member associated with the engine block (for example an alternator).

In the particular case of an air intake conduit, the conduit is generally integrated in an air intake circuit which may include other air intake conduits connected together in series and other components such as in particular a turbo, a throttle body, one or several heat exchanger(s). In addition to this assembly to the circuit, at least one of the air intake conduits is securely fastened in one or several mounting point(s) of an outer member such as the engine block, the chassis of the motor vehicle, or any other member associated with the engine block (for example an alternator).

This additional fastening allows in particular containing the pathway of the air intake circuit within a desired space in order to limit bulk without any risk of contact with other members of the motor vehicle during the displacements between the engine and the chassis.

Each additional fastening is generally made by a mounting device commonly referred to as fastening support or also more known as «mounting bracket».

Such a mounting device is already known and is composed of an annular body configured to surround the tubular item and a fastening tab arranged to be fastened at a mounting point to the outer member such that the chassis of the motor vehicle.

Because of the dimensional tolerances of the different engine components, it appears that the fastening of the conduits via the fastening tabs may be an operation which is particularly difficult to carry out for the assembler at the automotive assembly line if the fastening tabs are rigidly connected to the conduit, or on the contrary, are too loose in rotation and/or in translation relative to the conduit.

PRIOR ART

The air intake conduits made of extrusion-blow molded thermoplastics generally include one or several fastening tab(s) directly affixed on the intake conduit of a heating plate mirror type or of a vibration type welding operation. Possibly, the fastening tab may also be affixed by overmolding or by direct injection on the blown tubing forming the intake conduit.

There are also air intake conduits made of injection molded thermoplastics. Similarly to the conduits made by extrusion-blow molding, the air intake conduits made by injection may include one or several fastening tab(s) integrated during the injection of the tubing.

The drawback of such an assembly lies in that because the fastening tabs are rigidly assembled on the conduit, whether at the end of a welding operation or an overmolding or injection operation, it is necessary to provide an architecture of the conduit matching with the shape of the outer member by taking into account mechanical dispersions, operational constraints, clearances and dilations take-ups in operation.

In particular, most often, these conduits must include flexible sleeves at their ends to facilitate the assembly on engine and absorb the dimensional variations. But these sleeves add complexity to the manufacture of the conduits and present risks of leakage in their area of connection with the rigid conduit.

In order to overcome these drawbacks, there is known from the state of the art, in particular from the patent application EP 3 029 364 A1, an adjustable fastening support for mounting an air conduit on an outer member. In this document, the mounting device comprises a clamping ring provided with two free ends which can be spaced apart from each other to enable the positioning of the annular body around the air conduit and snap-fitting means allowing closing the annular body in a temporary loose configuration authorizing a free rotation of the annular body around the tubular item, before fastening it to the engine member.

Nonetheless, the free displacement of the body around the tubular item causes a risk of wear and slippage which may ultimately cause a degradation of the air intake conduit with all the risks inherent to the apparition of such damages. Moreover, the slippage of the fastening body around the item can lead to a progressive loosening of the clamping of the body around the item in operation, or even to the disengagement of the support and the item.

SUMMARY OF THE INVENTION

To this end, the invention relates to a support for fastening a tubular item to a mounting point of an outer member, of the type comprising:

a generally «C»-shaped annular body comprising two free ends which can be spaced apart to position the annular body around the item, the body comprising, over an inner face, a plurality of retaining notches capable of cooperating with the tubular item such that the annular body is adapted to perform an incremental rotation from one notch to the other under the effect of a mechanical bias in rotation, between first and second angular positions for temporary immobilization by the retaining notches, and a tab for fastening to the mounting point, characterized in that the support comprises means for limiting the rotational displacement relative to the tubular item in a circumferential direction within a predefined range of rotation of the support around the item, the limiting means comprises a finger extending in a longitudinal direction from the annular body and is configured to cooperate between two stops formed on the tubular item and angularly spaced apart to define the predefined range of rotation and in that the plurality of notches extend longitudinally over at least one inner face of the finger.

Thanks to the invention, the presence of the plurality of notches allows avoiding an inadvertent slippage during mounting of the assembly comprising the item and the support on the outer member but also during the operation while preserving the possibility of relative mobility of the item and the support in successive angular increments. The geometric elements forming the notches allowing immobilizing the item and the support.

A fastening support according to the invention may include one or more of the following features.

According to a preferred embodiment of the invention, the plurality of notches extend longitudinally in a region of the inner face of the annular body in the form of a strip which extend longitudinally in the axial direction.

According to a preferred embodiment of the invention, the support further comprises a means for limiting the displacement in rotation and/or in translation of the support relative to the tubular item, respectively in a circumferential direction within a predefined range of rotation of the support around the item and/or in an axial direction of the item within a predefined range of translation of the support along the item.

According to a preferred embodiment of the invention, the rotation limiting means comprises a finger extending in a longitudinal direction from the annular body and is configured to cooperate between two stops formed on the tubular item and angularly spaced to define the predefined range of rotation.

According to a preferred embodiment of the invention, the plurality of notches extend longitudinally over at least one inner face of the finger.

According to a preferred embodiment of the invention, the plurality of notches extend longitudinally over the inner face of the annular body from the end of the finger up to the opposite annular edge.

According to a preferred embodiment of the invention, the rotation limiting means and the means for limiting the axial displacement comprise an aperture formed on the annular body extending in a circumferential direction, configured to cooperate with a protruding rib of the tubular item.

According to a preferred embodiment of the invention, the annular body is elastically deformable to enable the spacing apart of the two free ends from each other.

According to a preferred embodiment of the invention, the annular body comprises, at the free ends thereof, first and second extensions which extend from the annular body in an outer lateral direction and are configured to form together the fastening tab by being superimposed on each other.

According to a preferred embodiment of the invention, the support comprises complementary pre-holding connecting members which are provided on each of said extensions and are configured so that, in the connected state, the extensions are connected together according to a loose configuration authorizing the incremental rotation of the annular body around the tubular item.

According to another preferred embodiment of the invention, each of the extensions comprises a hole, the holes being intended to face each other to form a through passage in the fastening tab for receiving an element for clamping the two extensions on the outer member such that the clamping of the element causes the two extensions to mutually come closer from the temporary loose configuration to a definitive tight configuration, preventing any relative displacement of the item and the annular body.

According to another preferred embodiment of the invention, the pre-holding members are formed setback from an edge of an inner face respectively of the first and second extensions.

The invention may further comprise a fastening assembly comprising a fastening support according to the invention and a tubular item, characterized in that the tubular item comprises a complementary means for limiting the rotation of the fastening support.

An assembly according to the invention may further include one or the other of the following features.

According to a preferred embodiment of the invention, the tubular item comprises a complementary means for limiting the longitudinal displacement of the support along the item.

According to a preferred embodiment of the invention, the tubular item comprises at least one first annular rib protruding radially outwards to limit the longitudinal translation, and preferably comprises at least one second annular rib, the fastening support being intended to be guided in translation between these two ribs.

According to another preferred embodiment of the invention, the fastening support being according to the invention, the first annular rib is interrupted over an angular sector which defines the predefined range of rotation within which the finger is displaced.

BRIEF DESCRIPTION OF THE DRAWINGS

Other features and advantages of the invention will appear in light of the following description, made with reference to the appended drawings in which.

DESCRIPTION OF THE EMBODIMENTS

Figure 1:
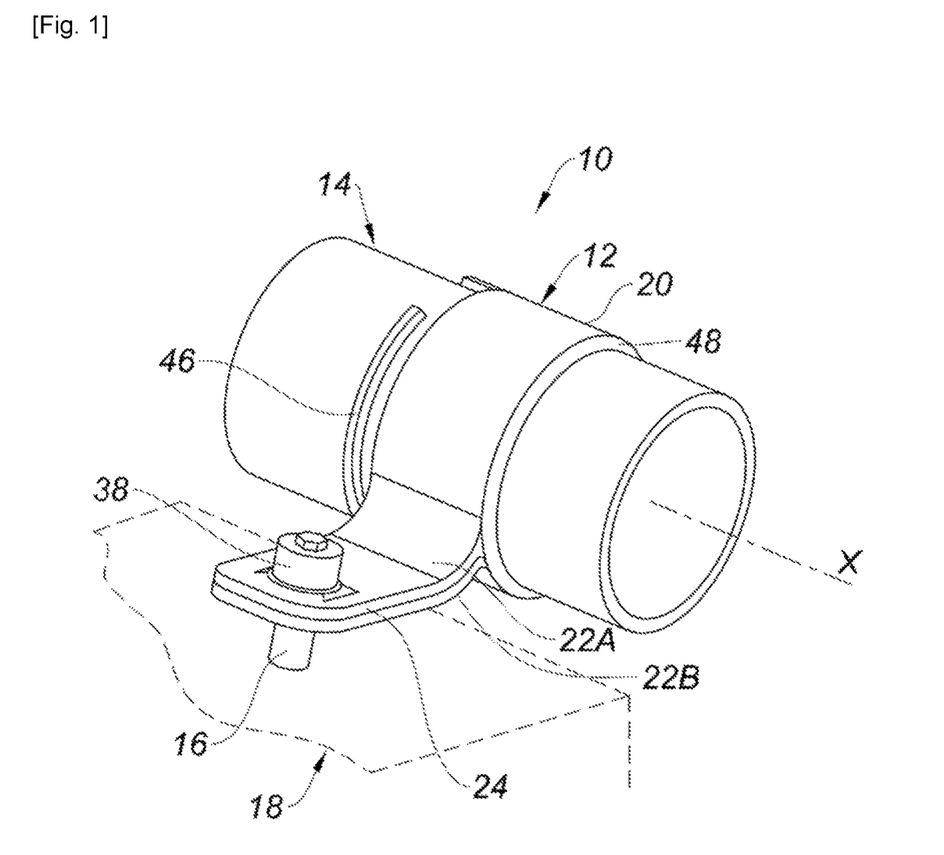
FIG. 1 is a perspective view of an assembly according to a first embodiment of the invention comprising a fastening support and a tubular item mounted on an outer member.

In FIG. 1, a fastening assembly is represented according to a first embodiment. This assembly is designated by the general reference numeral 10. The assembly 10 comprises a fastening support 12 and a tubular item 14.

In the example illustrated in FIG. 1, the support 12 is intended to fasten the tubular item 14 to a mounting point 16 of an outer member 18. More specifically, in the described example, the tubular item 14 is an air intake conduit of an intake circuit of a motor vehicle. The tubular item 14, hereinafter referred to in this example as conduit 14, has a generally tubular shape about a longitudinal axis X (FIG. 1). For example, the outer member 18 is an engine block, or a chassis of the motor vehicle, or any other member associated with the engine.

The air intake conduit 14 is preferably made of a preferably rigid polymer material and for example a thermoplastic polymer such as: polyamide (PA), polybutylene terephthalate (PBT), a co-polymer of a thermoplastic polyester with an elastomer (TPC-ET), Polypropylene (PP), a copolymer of polypropylene with ethylene-propylene-diene-monomer (PP-EPDM), polyphthalamide (PPA), polyphenylene sulfide (PPS).

Optionally, said thermoplastic polymer may be charged with reinforcing fibers, in particular glass fibers.

Figure 2:
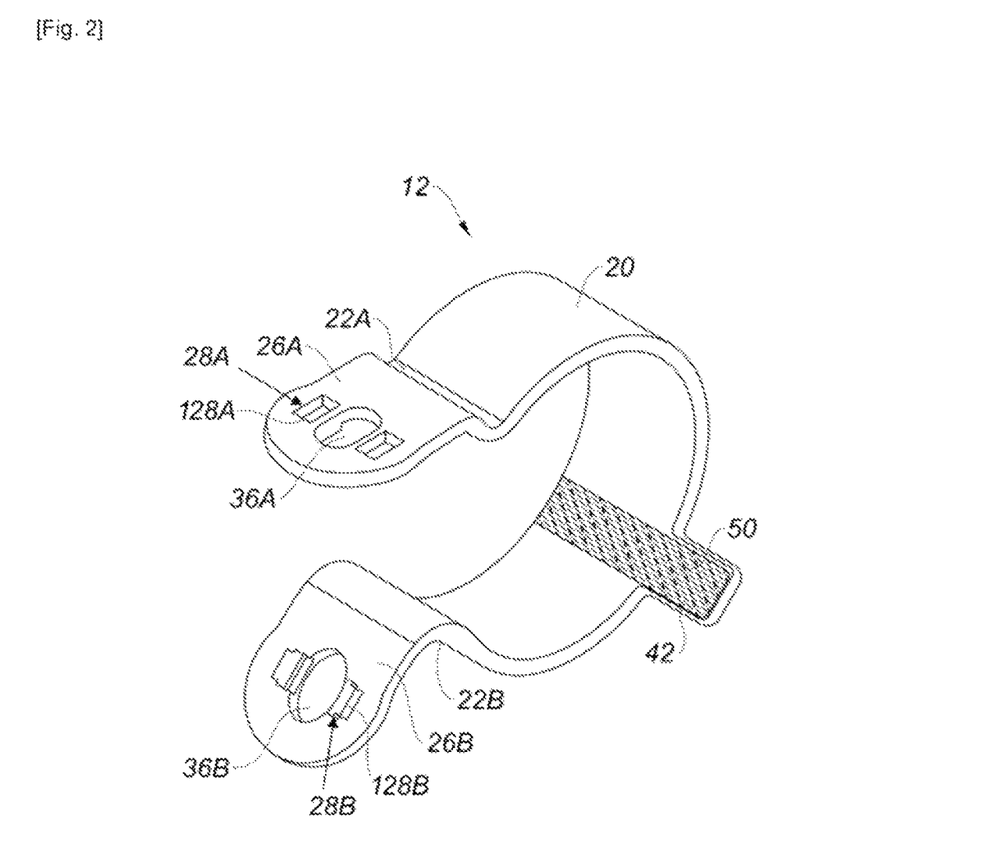
FIG. 2 is a perspective view of the fastening support represented in FIG. 1.

As illustrated in detail in FIG. 2, the fastening support 12 comprises a generally «C»-shaped annular body 20 intended to receive and hold the conduit 14. This annular body 20 comprises two free ends 22A and 22B which can be spaced apart to position the annular body 20 around the item 14.

Preferably, in this first embodiment, the annular body 20 is elastically deformable to enable the spacing apart of the two free ends 22A, 22B from each other. For example, the fastening support 12 is preferably preformed into an open ring with a general «C»-shape, with a shape substantially conjugate to the shape of the tubular item 14.

The fastening support 12 is preferably made of a thermoplastic polymer material, preferably not charged with glass fibers, such as polyamide (PA), polybutylene terephthalate (PBT), a co-polymer of a thermoplastic polyester with an elastomer (TPC-ET), Polypropylene (PP), a copolymer of polypropylene with ethylene-propylene-diene-monomer (PP-EPDM), polyphthalamide (PPA), polyphenylene sulfide (PPS). Said thermoplastic polymer may also, optionally, be charged with reinforcing fibers, in particular glass fibers. Such a polymer material advantageously allows for an easy manufacturing of a lightweight and low-cost fastening support, preferably by injection molding. Possibly, alternatively, the fastening support 12 is made of another thermoplastic, thermoplastic elastomer, or thermosetting material or even a metal material.

The fastening support 12 further comprises a tab 24 for fastening the support 12 to the mounting point 16 of the outer member 18. This fastening tab 24 extends in this example from the annular body 20 in a lateral outer direction.

To this end, in the illustrated example, the annular body 20 comprises, at its free ends 22A and 22B, first 26A and second 26B extensions which extend from the annular body 20 in the outer lateral direction and are configured to form together the fastening tab 24 by being by mutually brought closer to each other.

Furthermore, in order to secure the two extensions 26A, 26B together and thus form a fastening tab 24 in one-piece, the support 12 comprises complementary pre-holding connecting members 28A, 28B which are provided on each of said extensions 26A, 26B and are adapted to cooperate together to close the support 12 around the item 14.

Preferably, these first 28A and second 28B pre-holding members are configured so that, in the connected state, the extensions 26A, 26B forming the fastening tab 24 are connected together according to a loose configuration authorizing a limited displacement of the annular body 20 relative to the tubular item 14. In this loose configuration, the two extensions 26A, 26B are not clamped against each other but have an interposed clearance 60 authorizing a limited displacement of the two extensions 26A, 26B relative to each other. This is shown in detail in FIG. 5.

Preferably, the loose configuration authorizes both a rotational (azimuthal) free adjustment of the support 12 around the item 14 and a free adjustment in axial translation of the support 12 along the item 14. This temporary fastening configuration thus enables a relative freedom of displacement of the fastening support 12 relative to the item 14 while the pre-holding members 28 are engaged with each other.

In the illustrated example, the complementary pre-holding members 28A, 28B comprise snap-fitting means 128A, 128B which are provided on each of said extensions 26A, 26B. Thus, the first extension 26A comprises a first snap-fitting means 28A and the second extension 26B comprises a second complementary snap-fitting means 28B cooperating with the first means 28A. As shown in FIG. 2, the first and second snap-fitting means 28A, 28B are disposed respectively on inner faces facing each other of said extensions 26A, 26B.

Figure 5:
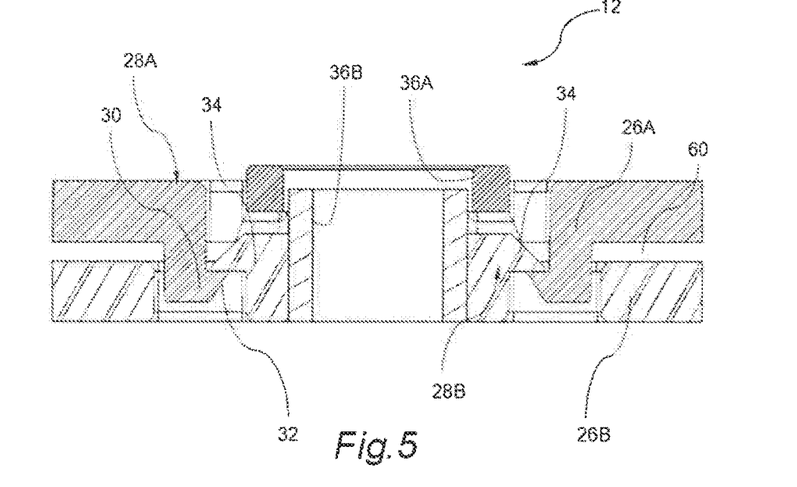
FIG. 5 is a sectional view of the snap-fitting means in a loose configuration.
Figure 6:
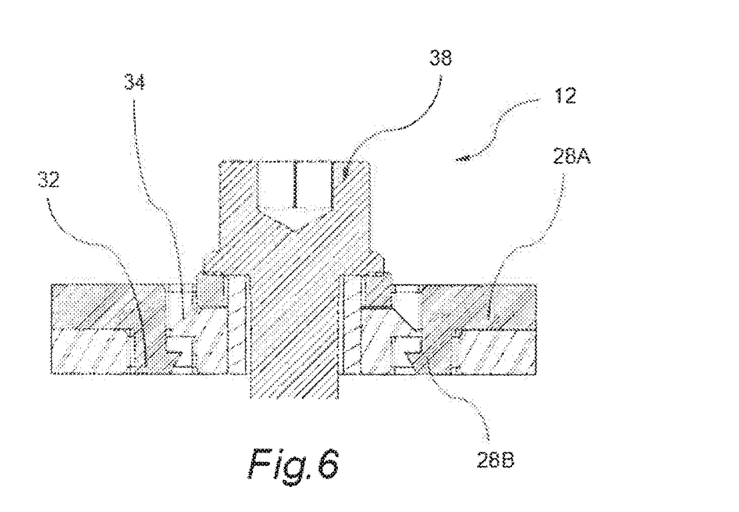
FIG. 6 is a sectional view of the snap-fitting means in a tight configuration.

As illustrated in FIG. 5, the first snap-fitting means 128A comprises for example at least one snap-fitting lug 30 and the second snap-fitting means 128B comprises at least one corresponding orifice 32 pierced in the extension 28B provided with a snap-fitting catch 34 protruding inside the orifice 32. When inserted into the orifice 32, the snap-fitting lug 30 cooperates with the snap-fitting catch 34 by elastic deformation to enable crossing of the protruding catch 34 and the passage of the lug 30 inside the orifice 32 to obtain a forced snap-fitting. Preferably, the first snap-fitting means 128A comprises a pair of snap-fitting lugs 30 and the second snap-fitting means 128B comprises a pair of orifices 32 and snap-fitting catches 34. Furthermore, as shown in FIG. 5, each of the lugs 30 and catches 34 are provided with a chamfer such that the chamfers are engaged and cooperate mutually during the snap-fitting operation.

In the described example, the fastening support 12, after having been elastically open so as to be engaged around the tubular item 10, can spring back to its original shape in which said first extension 26A can easily come closer to said second extension 26B. By a simple application of finger pressure on the pre-holding members 28, by snap-fitting in the described example, the extensions 26A, 26B can form the fastening tab 24 then, it is possible to freely adjust the position of the support 12 relative to the item 14.

Moreover, in the described example, the first and second extensions 26A, 26B are perforated and each delimits a through hole 36A, 36B. When mutually bringing closer the extensions 26A, 26B, the holes 36A, 36B come to face each other to enable the passage of a clamping element 38 from the tab 24 for fastening to the mounting point 16 of the external body 18.

Figure 4:
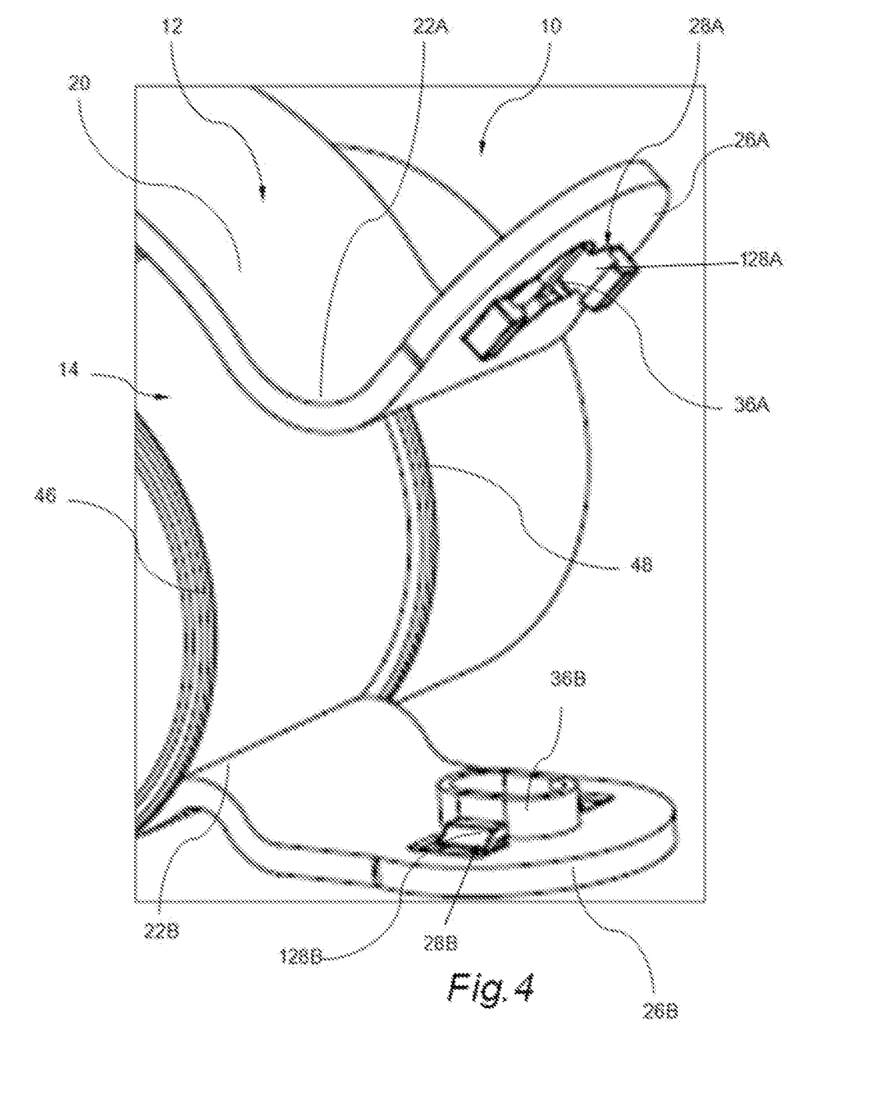
FIG. 4 is a partial perspective view of the assembly of FIG. 1 representing in detail snap-fitting means of the fastening support.

Furthermore, in the illustrated example, the holes 36A, 36B have peripheral edges shaped so as to fit into each other. For example, the hole 36B is, as shown in FIG. 4, provided with a peripheral socket that fits inside the hole 36A. Preferably, this metal socket, for example made of steel, is intended to prevent an excessive crushing which may cause a breakage of the extensions 26A and/or 26B during the tightening of the screw 38 or which may cause the creeping of the extensions 26A and 26B then leading to unclamping of the fastening tab 14.

When fastening the clamping member 38 on the outer member 18 to the mounting point 16, said extensions 26A, 26B are further configured to mutually come closer from the temporary loose configuration to a definitive tight configuration preventing any relative displacement of the item 14 and the annular body 20 by fastening the clamping member 38 to the mounting point 16.

In the described example, the fastening support 12 further comprises a means 40 for limiting the rotational displacement relative to the tubular item 14. Preferably, this means 40 limits the rotation of the tubular item 14 in a circumferential direction within a predefined range of rotation of the support 12 relative to the item 14.

According to this first embodiment, the rotation limiting means 40 comprises a finger 42 extending in a longitudinal direction from the annular body 20 configured to cooperate with a complementary stop formed on the tubular item 14. In this first embodiment, the intake conduit 14 comprises complementary means for limiting the rotation of the fastening support 12.

For example, as illustrated in FIG. 1, the complementary means comprises a first annular rib 46 formed on the tubular item 14 and interrupted over an angular sector which defines the predefined range of rotation within which the finger 42 can be displaced.

Furthermore, preferably, in this first embodiment, the conduit 14 is provided with a means for limiting the translation of the support 12 relative to the tubular item 14 in an axial direction of the item 14 within a predefined range of translation of the support 12 along the item 14.

To this end, the tubular item 14 comprises at least one second annular rib 48 protruding radially outwards to limit the longitudinal translation.

In accordance with the invention, the annular body 20 further comprises, over its inner face, a plurality of retaining notches 50 adapted to cooperate with the tubular item 14. Thus, the annular body 20 is adapted to perform an incremental rotation from one notch to the other under the effect of rotational mechanical biasing, between first and second angular positions for temporary immobilization by the retaining notches 50.

Preferably, in this first embodiment, the plurality of notches 50 extend longitudinally over at least one inner face of the finger 42. Furthermore, the tubular item 14 is also provided with a plurality of notches 52 engaging the plurality of notches 50 of the fastening support 12 (FIG. 3).

Preferably, the width of the notches 50 may be defined depending on a desired angular accuracy for the incremental rotation. The height of the notches 50 may be selected according to the desired hooking capability.

Figure 3:
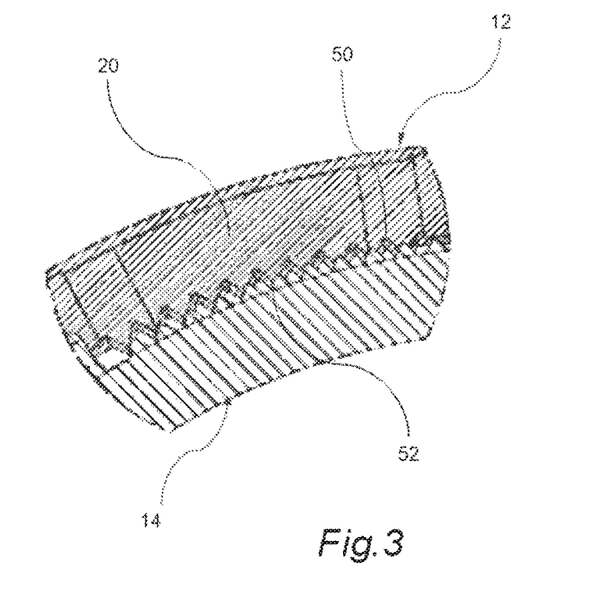
FIG. 3 is a detailed sectional view of a notching mechanism for retaining the fastening support and the tubular item of the assembly of FIG. 1.

As represented in FIG. 3, the section of a notch is preferably triangular, but any other shape of notches is also possible, such as, for example, a section with a substantially sinusoidal shape.

The complementary pre-holding connecting members 28A and 28B which are provided on each of said extensions 26A, 26B, are preferably configured so that, in the connected state, the extensions 26A, 26B are connected together according to a loose configuration authorizing the incremental rotation of the annular body 20 around the tubular item 14.

Of course, in a variant of the invention which is not illustrated, the fastening support may be devoid of any rotation limiting means and therefore of any finger. In this case, the plurality of notches extends inside an inner face of the annular body.

Figure 11:
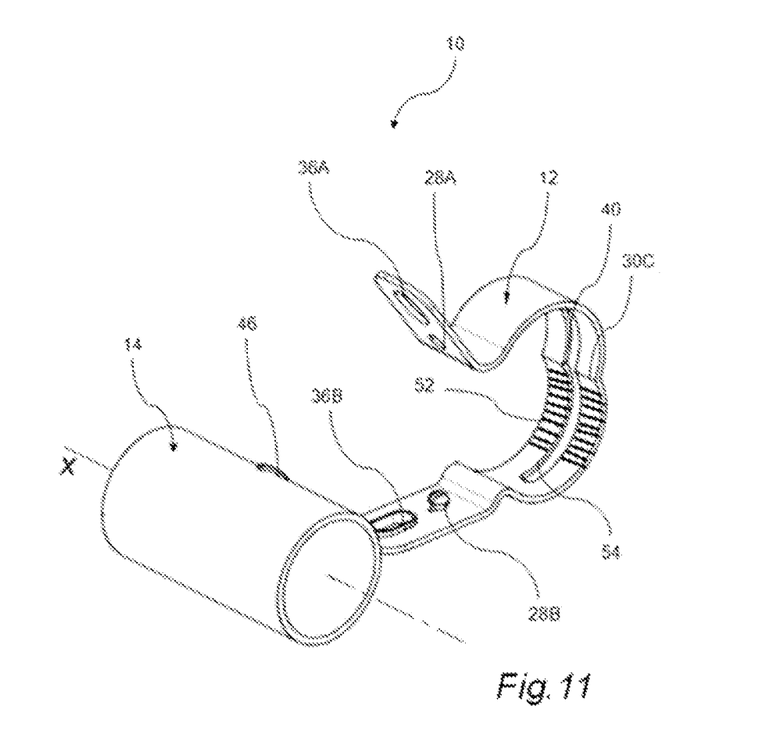
FIG. 11 is a perspective view of an assembly comprising a tubular item and a fastening support according to a second embodiment of the invention.

In FIG. 11, a fastening support 12 is represented according to a second embodiment. In this second embodiment, elements similar to those of the first embodiment bear identical reference numerals.

In this second embodiment, the fastening support 12 comprises an annular body 20 comprising two arches connected together by a hinge area 30C. This hinge area forms a hinge or fold. Each arch is also provided with an extension 26A, 26B to form together, a fastening tab 24.

As in the first embodiment, the fastening support 12 comprises a generally «C»-shaped annular body 20 intended to receive and hold the conduit 14. This annular body 20 comprises two free ends 22A and 22B which can be spaced apart to position the annular body 20 around the item 14 thanks to the hinge or the fold.

Prior to the placement on the tubular item 14, the fastening support 12 is wide open and the arches are sufficiently spaced apart from each other to enable the insertion of the tubular item 14 into the fastening support 12. The arches and extensions 26A, 26B can then be brought closer to enclose the fastening support 12 around the tubular item 14.

The annular body 20 and more particularly the arches and the hinge area 30C are preferably made in one piece with the extensions 26A, 26B of a semi-rigid material which is, on the one hand, sufficiently rigid to enable an effective clamping of the annular body 20 by constriction on the tubular item 14 and, on the other hand, sufficiently flexible to enable the elastic bending necessary to open the annular body 20 and engage the fastening support 12 around the tubular item 14.

In this embodiment, the annular body 20 carries a plurality of notches 50 intended to cooperate with a series of complementary notches 52 carried by the tubular item 14.

Preferably, in this second embodiment, the rotation limiting means comprises an aperture 54 formed on the annular body extending in a circumferential direction, configured to cooperate with a protruding rib 46 of the tubular item 14.

Referring to FIGS. 7 to 10, the main operation aspects of a fastening assembly will now be described according to the first embodiment.

Figure 7:
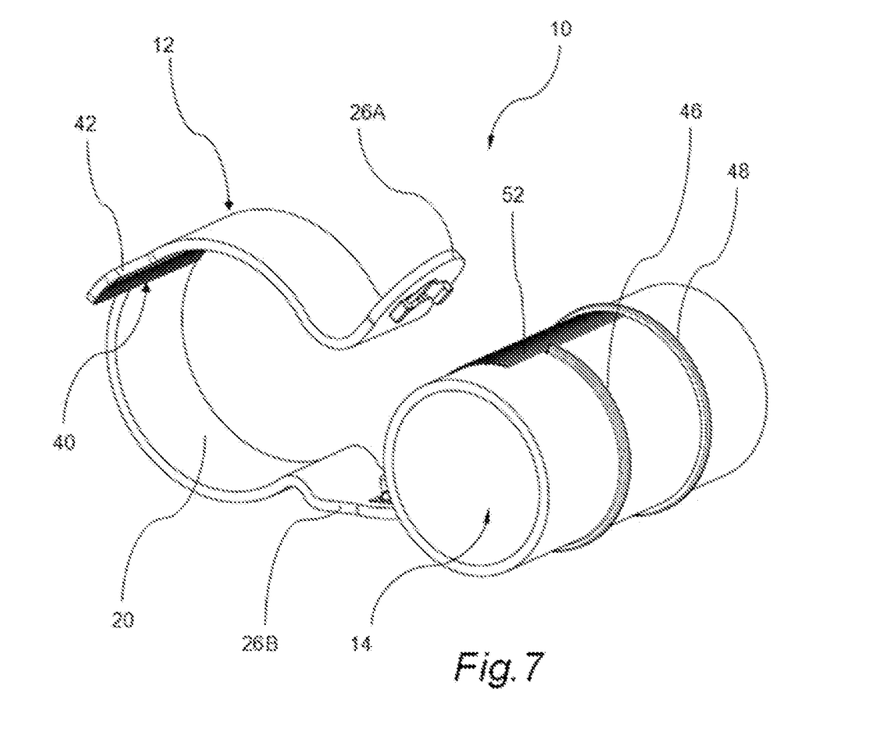
FIG. 7 illustrates a first step of mounting the assembly of FIG. 1.

Initially, the fastening assembly 10 is in the disassembled state. The tubular item 14 and the fastening support 12 are then separated from each other as illustrated in FIG. 7.

Figure 8:
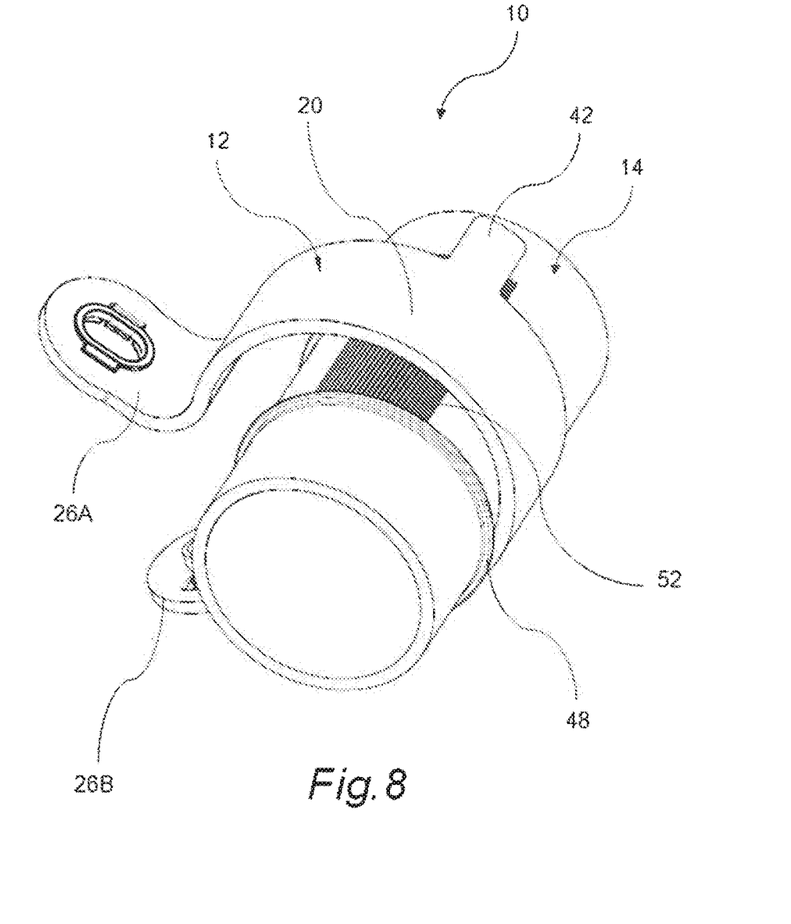
FIG. 8 illustrates a second step of mounting the assembly of FIG. 1.
Figure 9:
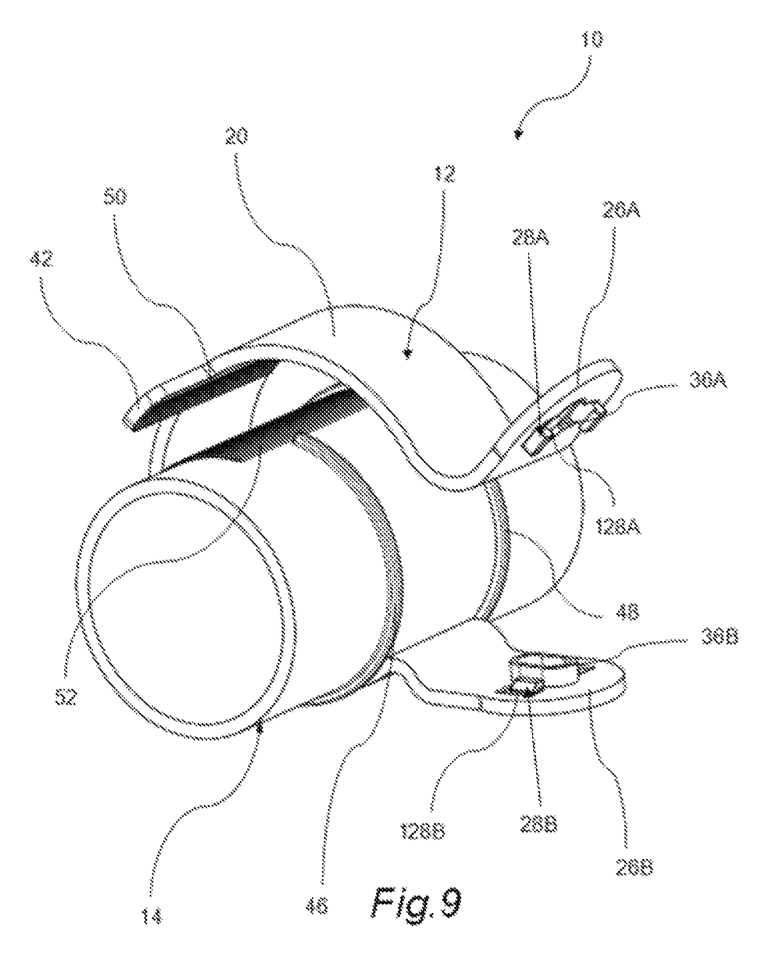
FIG. 9 illustrates the second mounting step according to a viewpoint different from that of FIG. 8.

During a first step, the fastening support 12 is deformed to space apart the two extensions 26A and 26B, which allows inserting the tubular item 14 inside the annular body 20 of the support 12. As illustrated in FIG. 8, the support 12 is positioned around the tubular item 14 in the annular space delimited by the two ribs 46 and 48 so that the finger 42 is introduced inside the interrupted angular section of the rib 46.

Figure 10:
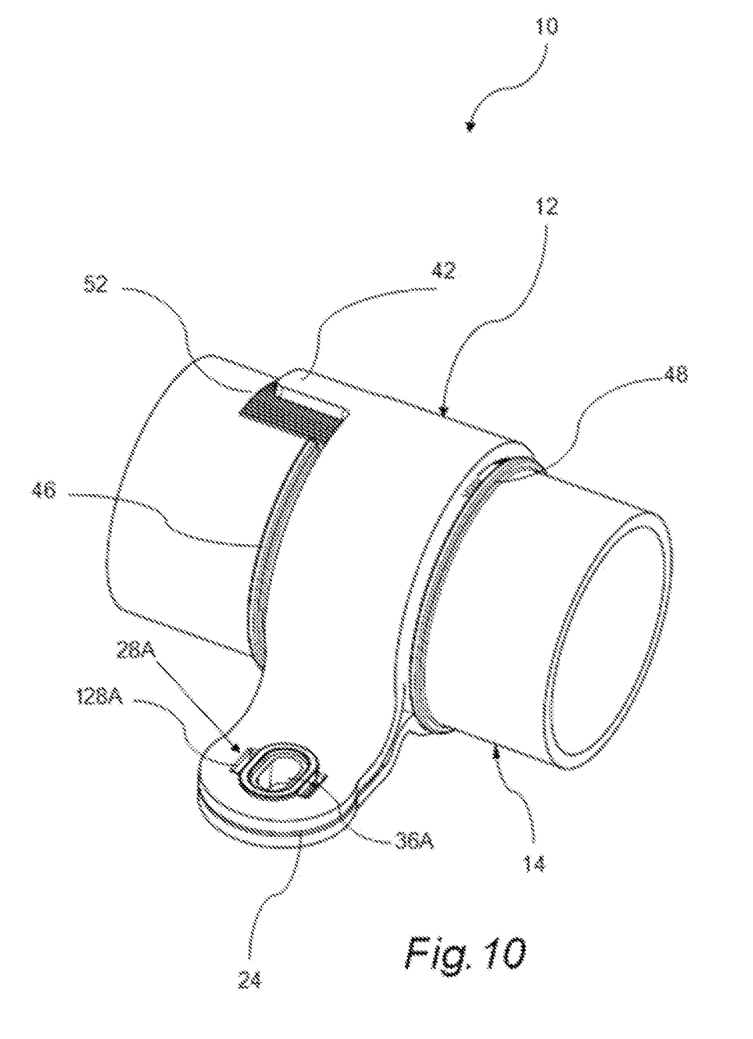
FIG. 10 illustrates a third step of mounting the assembly of FIG. 1.

Then, during a second step illustrated in FIG. 10, the pre-holding members 28A, 28B are assembled such that the fastening support 12 is trapped by the tubular item 14 between the two ribs 46 and 48. The rotation and the translation of the support 12 relative to the tubular item 14 are thus limited.

Thanks to the invention, the rotation around the tubular item 14 is made in an incremental manner which allows gradually adjusting the position of the support 12 relative to the item 14 by successive angular notches and preventing an inadvertent slippage of the support 12 around the tubular item 14 during the operation of the vehicle in a clamped position.

Of course, the invention is not limited to the previously described embodiments. Other embodiments within the reach of those skilled in the art may also be considered without departing from the scope of the invention defined by the claims hereinafter.

The invention claimed is:

1. A support for fastening a tubular item to a mounting point of an outer member comprising:
   a generally C-shaped annular body around an axis comprising two free ends which can be spaced apart to position the annular body around the item, this annular body comprising, over an inner face, a plurality of retaining notches capable of cooperating with the tubular item such that the annular body is adapted to perform an incremental rotation from one notch to another notch under an effect of a mechanical bias, between first and second angular positions for temporary immobilization in rotation by the retaining notches, and
   a tab for fastening to the mounting point,
   wherein the support comprises means for limiting a rotational displacement relative to the tubular item in a circumferential direction within a predefined range of rotation of the support around the item, the limiting means comprises a finger extending in a longitudinal direction from the annular body and is configured to cooperate between two stops formed on the tubular item and angularly spaced apart to define the predefined rotation range and in that the plurality of notches extend longitudinally over at least one inner face of the finger.

2. The support according to claim 1, wherein the plurality of notches extend longitudinally over a region of the inner face of the annular body in a form of a strip which extends longitudinally in an axial direction.

3. The support according to claim 1, further comprising a means for limiting a translational displacement of the support relative to the tubular item in an axial direction of the item within a predefined range of translation of the support along the item.

4. The support according to claim 3, wherein the rotation limiting means and a means for limiting an axial displacement comprise an aperture formed on the annular body extending in a circumferential direction, configured to cooperate with a protruding rib of the tubular item.

5. The support according to claim 1, wherein the plurality of notches extend longitudinally over the inner face of the annular body from one end of the finger up to an opposite annular edge of the annular body.

6. The support according to claim 1, wherein the annular body is elastically deformable to enable a spacing apart of the two free ends from each other.

7. The support according to claim 1, wherein the annular body comprises, at the free ends thereof, first and second extensions which extend from the annular body in an outer lateral direction and are configured to form together the fastening tab by being superimposed on each other.

8. The support according to claim 7, comprising complementary pre-holding connecting members which are provided on each of said extensions and are configured so that, in a connected state, the extensions are connected together according to a loose configuration authorizing the incremental rotation of the annular body around the tubular item.

9. The support according to claim 8, wherein each of the first and second extensions is provided with a hole, the holes being intended to face each other to form a through passage in the fastening tab for receiving an element for clamping the two extensions on the outer member such that the clamping of the element causes the two extensions to mutually come closer from a temporary loose configuration to a definitive tight configuration while preventing any relative displacement of the item and the annular body.

10. The support according to claim 8, wherein the pre-holding members are formed setback from an edge of an inner face respectively of the first and second extensions.

11. A fastening assembly comprising a fastening support according to claim 1 and a tubular item, wherein the tubular item comprises a complementary means for limiting a rotation of the fastening support.

12. The assembly according to claim 11, wherein the tubular item comprises a complementary means for limiting a longitudinal displacement of the support along the item.

13. The assembly according to claim 12, wherein the tubular item comprises at least one first annular rib protruding radially outwards to limit a longitudinal translation, the fastening support being intended to be guided in translation between the at least one first annular rib.

14. The assembly according to claim 13, wherein, the first annular rib is interrupted over an angular sector which defines the predefined range of rotation within which the finger is displaced.

* * * * *